June 16, 1942.   W. C. MacFADDEN   2,286,991
FASTENER INSTALLATION
Filed July 10, 1940

Inventor:
Wilford C. MacFadden.
By John Todd
Att'y.

Patented June 16, 1942

2,286,991

UNITED STATES PATENT OFFICE 2,286,991

FASTENER INSTALLATION

Wilford C. MacFadden, Philadelphia, Pa., assignor to United-Carr Fastener Corporation, Cambridge, Mass., a corporation of Massachusetts Application July 10, 1940, Serial No. 344,645

3 Claims. (Cl. 173—328)

This invention relates to improvements in fasteners and fastener installations. The fastener is particularly useful in connection with a plug and socket installation and cooperates in a way to effect automatic gripping engagement with a plug member on connection of the parts and serves to maintain the plug member in fixed attachment to the socket member.

Referring to the drawing, in which I have illustrated a preferred embodiment of my invention:

Figure 1:
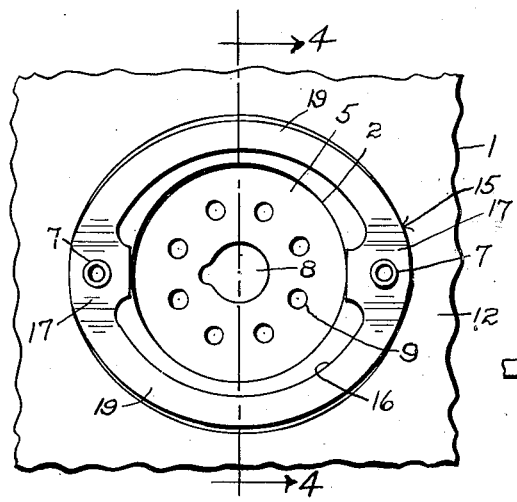
Fig. 1 is a top plan view of a preferred fastener installation embodying my invention and including a supporting panel, a socket member and my improved fastener member in position to receive and grip a plug member.
Figure 2:
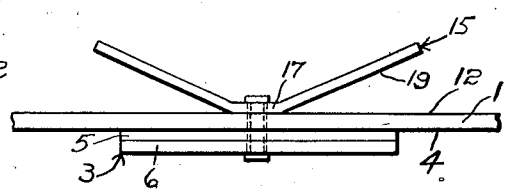
Fig. 2 is a side elevation of the installation shown in Fig. 1 with the parts turned 90°.
Figure 4:
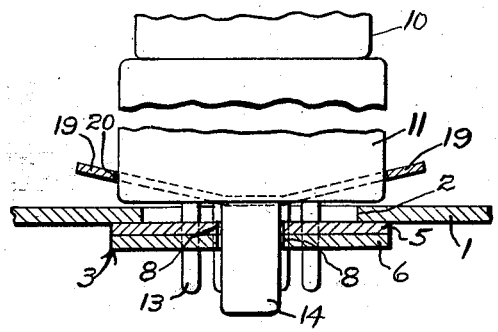
Fig. 4 is a sectional view taken along the line 4—4 of Fig. 1 and showing the manner in which my improved fastener member grips the plug member.

Referring in detail to the drawing, I have shown a preferred use of my invention in connection wiht a plug and socket installation wherein a socket member is secured on one side of a supporting panel and my improved fastener member is secured on an opposite side of the panel in position to grip the base of a plug member such as a vacuum tube to maintain the plug member in connection with the socket member. Although I have chosen to illustrate my improved fastener member in connection with an installation of this type, it is understood that the fastener is readily adaptable to use in connection with other installations for securing parts in assembly. Referring to the component parts of my preferred installation as illustrated in the drawing, I have provided a relatively thin supporting panel 1 having an opening 2 therein. A socket member 3 is secured to the lower surface 4 of the panel 1. The socket member 3 may be of any suitable construction, but I have preferred to show, for purposes of illustration, a socket member of the laminated type having a pair of superposed insulating plates 5 and 6. The socket member is secured to the support through means of rivets 7 extending therethrough. The rivets 7, in my preferred installation, also serve to secure my improved fastener member to the panel 1 in a manner hereinafter described. The insulating plates 5 and 6 have aligned central openings 8 (Fig. 4), preferably of non-circular shape, for receiving a non-circular guide prong of a cooperating tube member and the plates have a series of aligned terminal-receiving openings 9 (Fig. 1) disposed around the central opening 8 for receiving prong terminals of the tube member. Socket contacts (not shown) are provided as part of the socket member and may be of any suitable construction to provide terminal-engaging portions disposed between the insulating plates 5 and 6 in alignment with the openings 9 in a manner well known in the art.

A plug member is provided for electrical cooperation with the socket member and is preferably in the form of a vacuum tube 10 having a circular composition base 11 of predetermined diameter. The base 11 substantially abuts the upper surface 12 of the panel 1 when the parts are in assembly and provides a circular series of prong terminals 13 which extend through the opening 2 of the panel 1 into the terminal-receiving openings 9 of the socket member. A central guide prong 14 extends from the base 11 and is adapted to be received within the openings 8 of the socket member to assure proper engagement of the tube and socket contacts. The tube member 10 is held in assembly with the socket member against displacement by accidental jar or vibration through means of my improved fastener member 15 secured to the upper surface 12 of the panel 1 and providing resilient portions automatically engaging the tube base 11 when the parts are moved into electrical connection to hold the tube in assembly with the socket member.

Figure 5:
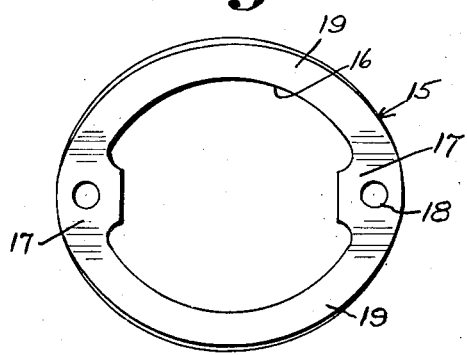
Fig. 5 is a top plan view of my improved fastener per se.
Figure 6:
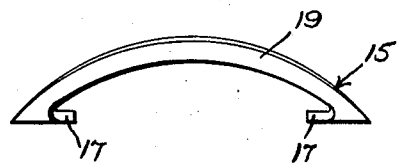
Fig. 6 is a side elevation of the fastener shown in Fig. 5.

The fastener member 15 is preferably stamped from a single piece of spring metal material and provides a ring-shaped portion of greater width than thickness surrounding an aperture 16. The ring member has a pair of diametrically opposed flat portions 17—17 which lie in substantially the same plane. Each of the flat portions 17 has an aperture 18 (Fig. 5) for receiving a rivet 7 wherein the ring member is secured in fixed engagement with the supporting panel 1, as most clearly shown in Fig. 1. Portions 19—19 of the ring member intermediate the flat portions 17—17 are bent to take an offset position relative to the normal plane of the portions 17 whereby the diameter of the aperture 16 through the offset portions 19 is normally less than the diameter of the tube base 11, thus in effect providing a normally oval-shaped aperture 16. As a result of this construction, wherein the portions 19—19 are offset, they lie normally in a plane which is biased with respect to the plane of the flat portions 17—17.

Figure 3:
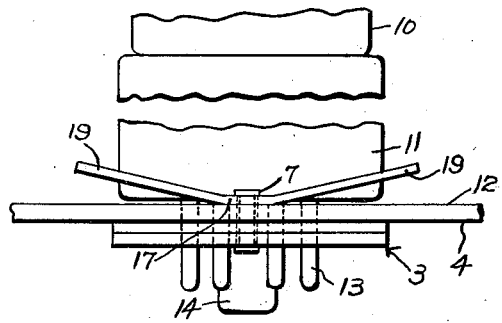
Fig. 3 is a view similar to Fig. 2 and showing the fastener member in gripping engagement with a plug member.

In assembling the tube with the socket member the guide prong 14 is first extended into the openings 8 of the socket member. When the parts are in this position, the tube base 11 engages the broad upper surfaces of the offset portions 19—19. When the tube is moved in the direction of the socket member under manual pressure, the offset portions 19—19 of the ring member are forced downwardly and outwardly until the diameter of the aperture 16 of the ring member through the offset portions 19—19 is greater than the diameter of the tube base 11 and the aperture becomes more nearly round. Thus the base 11 may be moved through the opening 16 into final position in substantial abutment to the panel 1 and the offset portions 19—19, as a result of their inherent resiliency, then tend to return to normal position and grip the base 11 so that the tube and socket are positively engaged. Full return is prevented by reason of the base 11 being disposed therebetween and consequently the inner edges 20 of the portions 19—19 resiliently engage the sides of the base, as most clearly shown in Figs. 3 and 4. The offset portions 19—19 are biased with respect to a transverse plane through the base 11, as most clearly shown in Fig. 4, and, as a result, operate to resist any forces tending to pull the plug member out of the socket.

Thus by my invention I have provided a fastener member of simple and inexpensive construction adapted to be secured to a supporting part and operable to maintain firmly an article of manufacture, such as a vacuum tube, in fixed position relative to the supporting part. Intentional displacement of the vacuum tube or the like from the fastener member may be accomplished by manually forcing the offset portions of the fastener toward the supporting structure so as to enlarge the oval ring opening across the narrowest part thereby permitting the tube to be easily withdrawn.

Although I have illustrated and described a preferred embodiment of my invention, I do not wish to be limited thereby because the scope of my invention is best defined by the following claims.

I claim:

1. In a fastener installation in combination with a support and an article for attachment to one side of said support; of a fastener member attached to the side of the support receiving the article and comprising a flexible ring member formed with opposed base portions for attachment to said support, and substantially semi-circular wing portions extending outwardly and angularly from opposite sides of said base portions, said ring members presenting an opening and being adapted to be engaged by the article and flexed thereby to a tensioned position permitting the passage of the article through the opening, said wing portions in said tensioned position resiliently gripping said article and resisting withdrawal of the article from the opening.

2. In a fastener installation in combination with a support and an article for attachment to one side of said support; of a fastener member attached to the side of the support receiving the article and comprising a flexible ring member formed with diametrically opposed support-engaging portions in fastened engagement with said support, and opposed substantially semi-circular wing portions between said support-engaging portions and disposed angularly with respect to the plane thereof, said ring members presenting an opening and being adapted to be engaged by the article and flexed thereby through the opening, said wing portions in said tensioned position resiliently gripping said article, and resisting withdrawal of the article from the opening.

3. In a fastener installation of the type described, in combination with a support and a plug adapted for attachment to said support; of a one-piece fastener member of flexible material located wholly on one side of said support, said fastener member comprising a single ring of ribbon-like spring metal disposed flatwise and formed with diametrically opposed support-engaging portions in fastened engagement with the support and opposed substantially semi-circular wing portions between said support-engaging portions disposed angularly with respect to the plane thereof, said ring members presenting an opening spaced from said support, the faces of said ring member being angularly disposed with respect to the longitudinal axis of said plug and constituting cam surfaces for engagement thereby as said plug is moved axially toward said support, causing flexing of the wing portions by said plug to a tensioned position in which the opening permits passage of the plug therethrough, said wing portions in their tensioned position resiliently gripping said plug and resisting withdrawal of the plug from the opening.

WILFORD C. MacFADDEN.